United States Patent [19]

McVaugh

[11] Patent Number: 5,193,785
[45] Date of Patent: Mar. 16, 1993

[54] EXTENSIBLE BOOM MECHANISM FOR USE WITH MOBILE CABLE SALVAGE APPARATUS

[76] Inventor: Arthur K. McVaugh, 2009 Old Sumneytown Pike, P.O. Box 694, Green Lane, Pa. 18054

[21] Appl. No.: 584,906

[22] Filed: Sep. 19, 1990

[51] Int. Cl.⁵ .......................................... B65H 59/00
[52] U.S. Cl. .............................. 254/134.3 R; 91/173; 91/445; 91/447; 92/55
[58] Field of Search .............. 254/134.3 R, 134.3 FT, 254/93 R; 269/32; 91/151, 173, 176, 178, 526, 445, 447; 92/31, 55

[56] References Cited

U.S. PATENT DOCUMENTS

| | | | |
|---|---|---|---|
| 2,942,848 | 6/1960 | Friesen | 254/93 R |
| 3,603,579 | 9/1971 | Odom | 269/32 |
| 3,610,100 | 10/1971 | Hoffman | 91/173 |
| 3,920,084 | 11/1975 | Russell | 92/31 |
| 3,955,797 | 5/1976 | Richards | 254/93 R |
| 3,956,970 | 5/1976 | Kupiek et al. | 91/173 |
| 4,391,183 | 7/1983 | Broms et al. | 91/445 |
| 4,523,512 | 6/1985 | Hessel et al. | 91/173 |
| 4,773,636 | 9/1988 | Takahashi | 269/32 |
| 4,949,943 | 8/1990 | Bernstein | 269/32 |

Primary Examiner—Robert C. Watson
Attorney, Agent, or Firm—Eugene E. Renz, Jr.

[57] ABSTRACT

An extensible mechanism, in which a first hydraulic cylinder and piston has a fixed reference for movement in an extension direction and also in a retraction direction. A second hydraulic cylinder and piston is moveable in both of these directions. Hydraulic fluid actuates the first and second hydraulic units in series, whereby actuation in the extension direction sequentially moves the first and second hydraulic piston and actuation in the retraction direction reverses the sequential order of movement of the two hydraulic pistons.

4 Claims, 6 Drawing Sheets

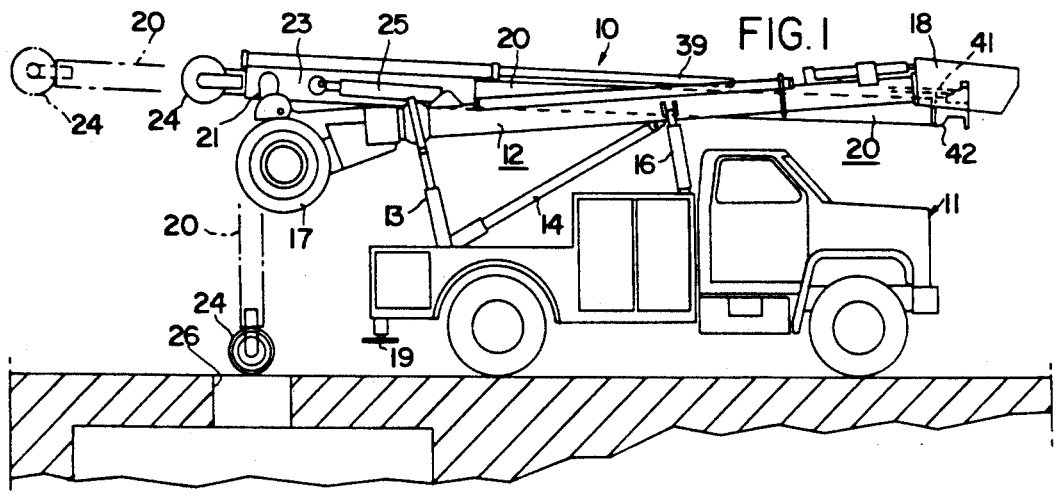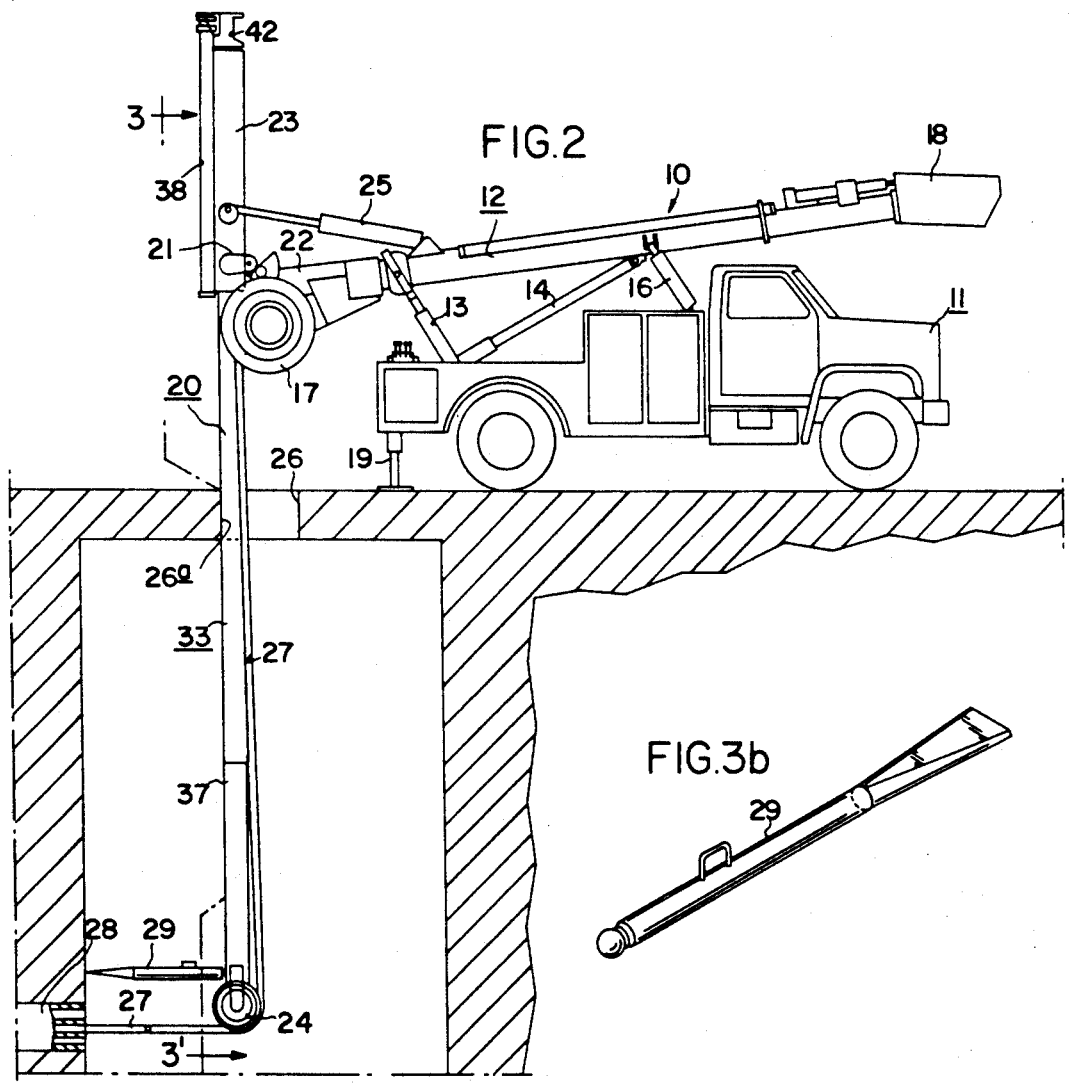

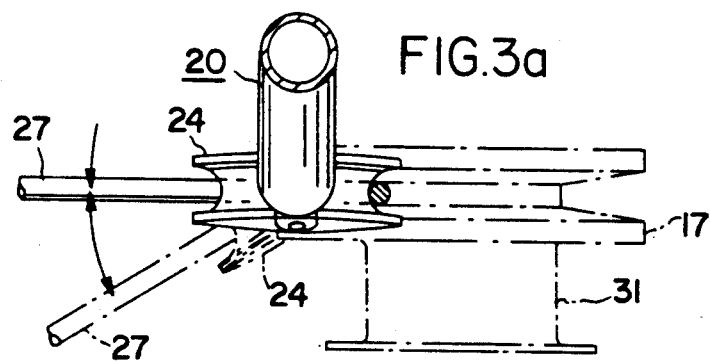
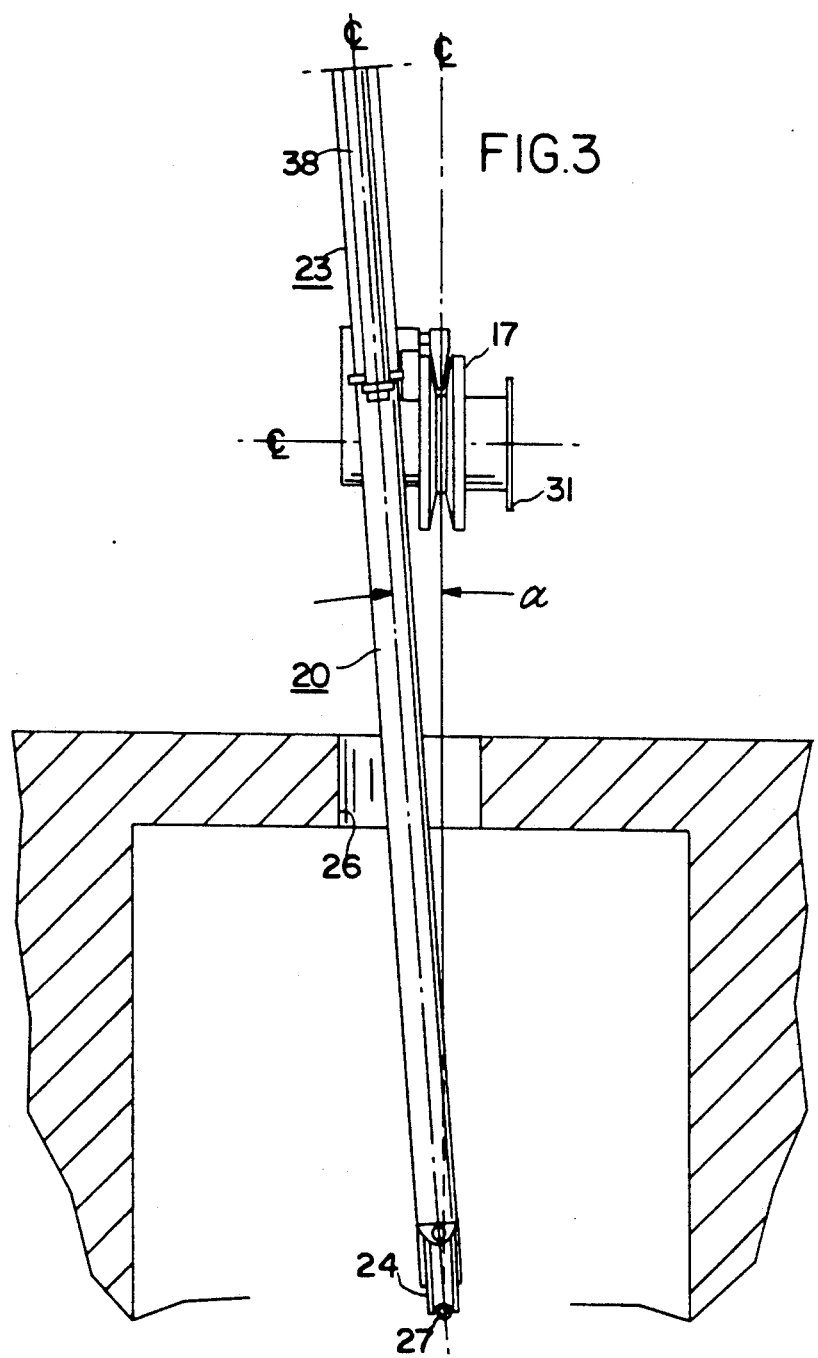

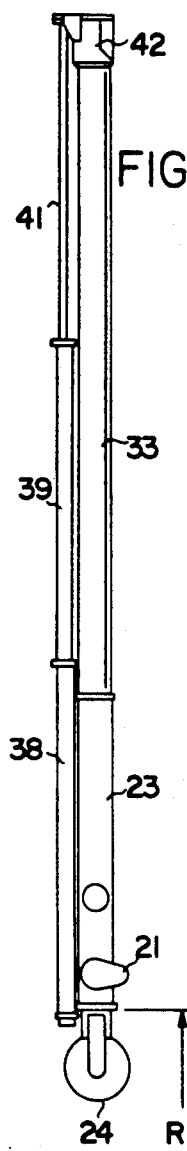
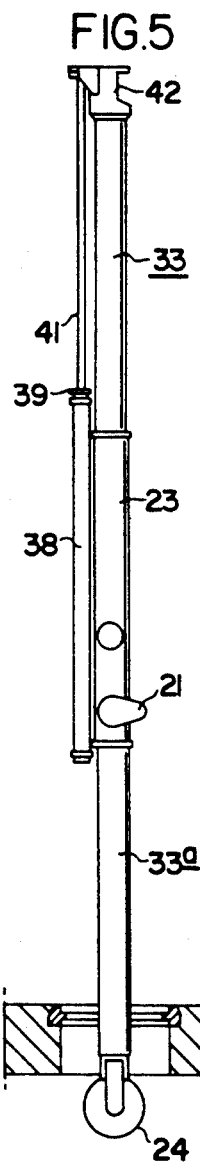
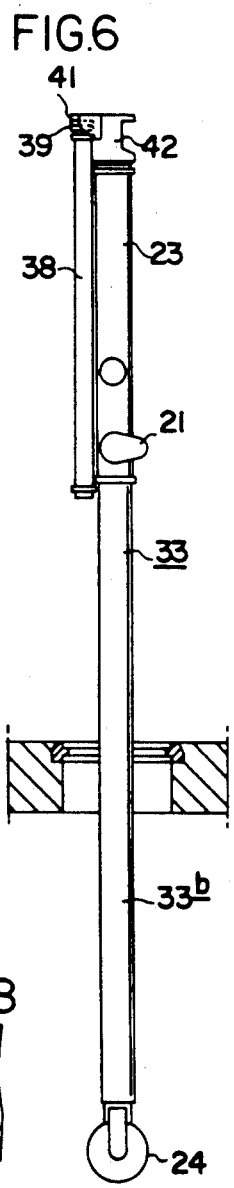
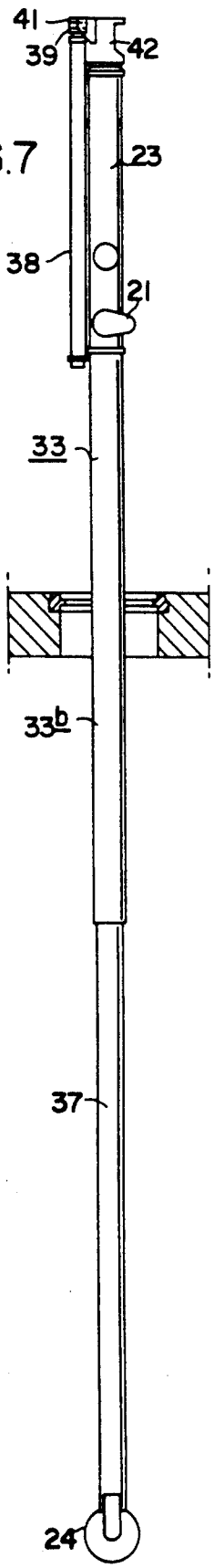
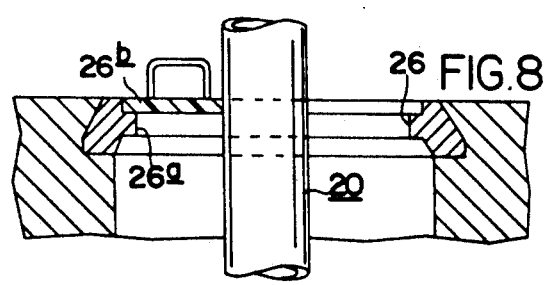

EXTENSIBLE BOOM MECHANISM FOR USE WITH MOBILE CABLE SALVAGE APPARATUS

FIELD OF THE INVENTION

The present invention relates to an extensible mechanism for extending and retracting one end of a device with respect to a fixed point located near the other end of the device. More particularly, the invention relates to an extensible mechanism such as a boom which can be extended and retracted to position an element on one end of the boom at a precise location with respect to the apparatus on which the boom is mounted. In a particular embodiment, the invention relates to a boom for positioning a sheave at a cable location, where the cable is underground or overhead, so that a cable pulling device can pull the cable in a straight line from the conduit for a short distance prior to changing direction of the cable and movement of the cable to the cable pulling apparatus.

BACKGROUND OF THE INVENTION

Public utilities use large amounts of underground electrical cable, such as electric power cable, telephone and telegraph cable, railroad and other public transportation cable systems, fire and police departments and traffic control signal generation cables and the like.

The preferred place of installation of cables of these type are below ground in conduits which protect the cables from weather and which do not disrupt the environment, either from an aesthetic point of view or from the very real practical problem of supporting many cables on overhead lines. Overhead lines have the further disadvantage of being susceptible to vandalism. In addition, they present potential danger to the population when cables may fall because of accidents, storms and the like.

However, even the best systems ultimately deteriorate. Underground cable either deteriorates and must be removed or replacement may be required of the cable by one which is larger or which contains other features. Even when the cables are placed underground, there is a limit to the number of cables and conduits which can be installed and so, it is desirable to remove old cable.

The process of cable removal can be expensive and difficult, particularly when many cables are packed together and separated by 400 to 800 feet intervals, which is the typical distance between manhole locations, particularly in the city. One device which has been admirably accepted as apparatus for removing cable from underground conduits is shown in U.S. Pat. No. 3,736,822. In this patent, a cable puller is shown which is mounted on a truck and which removes cable from manholes and other underground locations, and thereafter cuts them into disposable lengths. An improvement on that prior patent is disclosed in U.S. Pat. No. 3,799,016, in which an improved puller and an improved cutter are disclosed.

While these devices have served admirably over the past years, industry has been installing larger and more complex cables. As a result, the cables are more difficult to remove and, in some case in large cities, are at a depth which is 10, 20 or even up to 30 feet below the surface of the pavement. Nevertheless, it is important to remove cables once they have been phased out of service.

Not only is there a value in recycling copper, lead and other materials, in some municipalities cables are treated as real estate, resulting in taxation of the value of the installation. Vacant ducts significantly reduce the tax assessment. Thus, even if a cable is no longer in use, until it is removed it remains a source of expense.

One difficulty which has arisen in removing cables from underground locations, particularly as cables are larger and deeper, is that it has become more and more desirable to pull cables in a direction aligned with a true horizontal. If one can envision an 800 foot section of heavily corroded cable packed in a conduit with other cables, one can readily appreciate that tremendous force is necessary to pull the cable out of the conduit.

Efforts to extend the pulling boom into the manhole have not met with success at all. In some instances, the cable access and the boom access are misaligned, even by only as little as two or three degrees. Such a deviation induces a tangential stress moment which causes the cable to rotate in the conduit. The cable, upon rotation in the conduit, either becomes jammed in the conduit and cannot be removed or the cable is subjected to stresses which cause it to rupture or break. In either case, the ability to remove the cable has been frustrated.

Accordingly, it is an object of the present invention to provide apparatus for permitting cable to be withdrawn from conduits in a horizontal direction, thereby optimizing the efficiency of the cable removal apparatus.

Another object of the present invention is to provide a device for use with prior art cable pulling designs while maintaining the self-contained mobility of these truck mounted assemblies.

Still yet another object of the present invention is to provide an extensible mechanism which allows hydraulic movement of a point in both an extension direction and a retraction direction.

Other objects will appear hereinafter.

SUMMARY OF THE INVENTION

It has now been discovered that the above and other objects of the present invention may be accomplished in the following manner. Specifically, an extensible mechanism has been discovered in which a plurality of hydraulic means are provided. The hydraulic components move in both an extension direction and a retraction direction. The device of the present invention further includes means for actuating the various hydraulic means in series, whereby actuation in the extension direction sequentially moves the hydraulic means in one order, and actuation of the device in the reverse or retraction direction reverses the sequential order of movement of the hydraulic means.

In another form, the invention relates to an apparatus for pulling cable in either a salvaging or installing mode. A mobile platform is provided with a cable guiding assembling, including cable pulling wheel means. Cable cutting means may also be provided. A sheave is positioned proximate the location of the cable installation by an extensible means which movably presents the sheave to provide a straight path between the installation and the sheave and a second straight path from the sheave to the wheel. Axial rotation of the extensible boom allows precise alignment of the sheave at the conduit.

BRIEF DESCRIPTION OF THE DRAWINGS

These and other objects of the present invention and the various features and details of the operation and construction thereof are hereinafter more fully set forth with reference to the accompanying drawings, where:

FIG. 1 is a side elevational view of a mobile cable scrapper, showing the unit adjacent the manhole aperture, in which a downhole telescoping boom is shown in a retracted road travel mode. A dot and dash position, approximately horizontal, shows a first travel position of the telescoping boom to lower the overhead height of the boom when in the down-hole vertical position. The vertical dot and dash position is then assumed prior to inserting the down-hole telescoping boom to the desired working depth.

FIG. 2 is a side elevational view similar to FIG. 1 but showing the telescoping boom lowered to the desired working depth opposite to, and axially aligned with, a cable conduit. The telescoping boom can then be moved horizontally to abut against the inner rim of the manhole by means of the floating hydraulically actuated supporting structure. The rear end of the truck is stabilized by the street jacks. The severed end of the cable is passed under a sheave that is mounted to the lower terminal end of the telescoping boom and then drawn up to a take up wheel of the cable pulling assembly. At certain depths, the lower end of the boom is braced by an adjustable "stiff-leg" as shown.

FIG. 3 is an enlarged fragmentary sectional elevational view taken along line 3, 3 of FIG. 2 showing the fixed angular displacement or offset of the telescoping boom housing with respect to the vertical center line of the cable pulling wheel.

FIG. 3a is an enlarged fragmentary sectional plan view illustrating the castering of the sheave to align the pulled cable to the vertical plane of a cable pulling wheel. The cable pulling is superimposed on the full line fragment of the telescoping boom and a sheave in dot and dash outline.

FIG. 3b is a pictorial view of a stiff-leg used to support the lower end of the telescoping boom when pulling cable at greater depths.

FIGS. 4-7 are semi-schematic side elevational view showing the sequential extension of the telescoping boom with respect to a common height dimension, that extends from the road surface to the pivot point of the boom housing.

FIG. 8 is an enlarged fragmentary sectional side elevational view of the upper terminal end and aperture of a manhole showing a insert placed in the recessed pocket for the iron manhole cover. The telescoping boom is made to bear upon this surface instead of the iron ring of the manhole.

DETAILED DESCRIPTION OF THE PREFERRED EMBODIMENT

Figure 9:
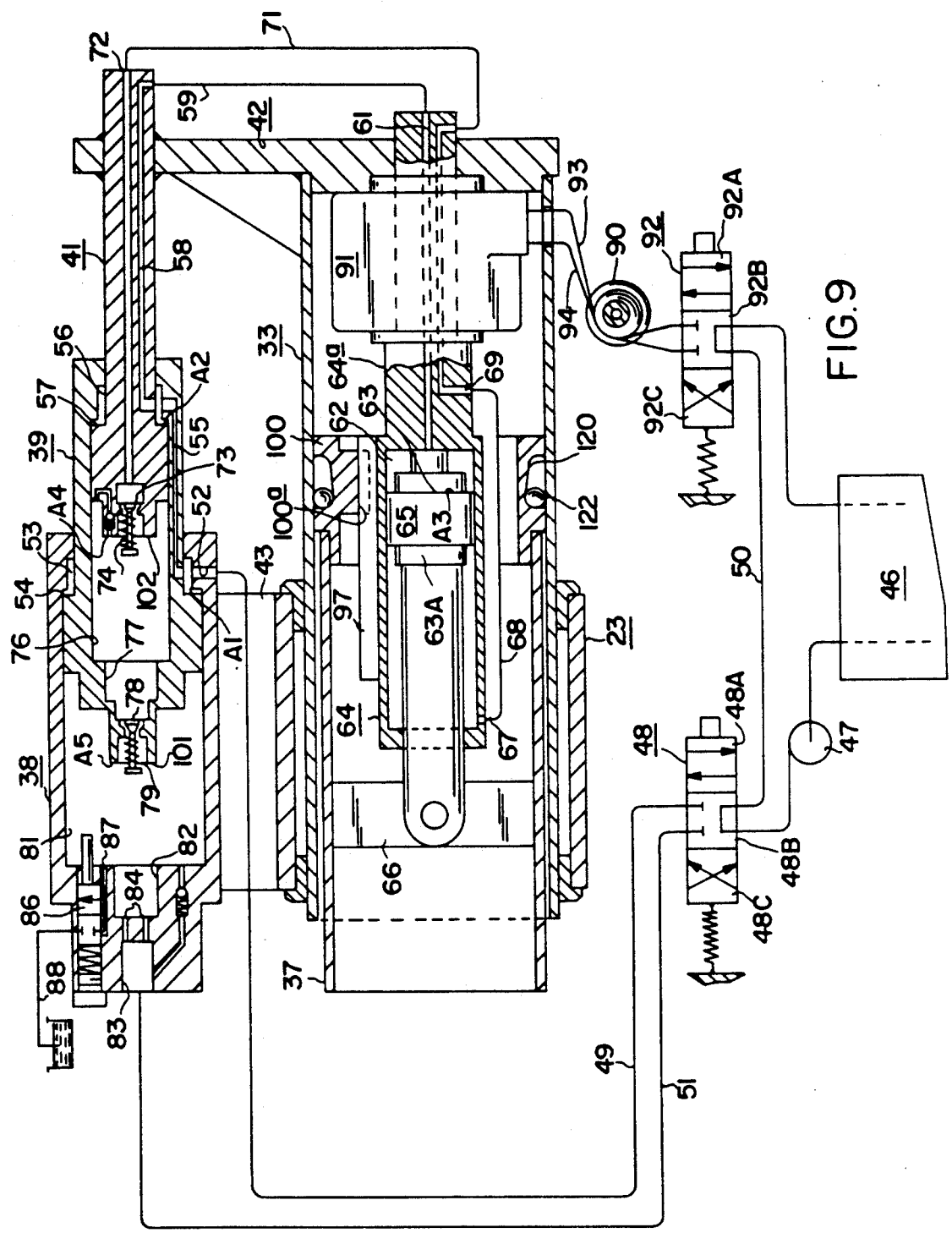
FIG. 9 a schematic elevational view of the 2 stage master cylinder and the associated telescoping boom, and related hydraulic circuit. In this view the telescoping boom is in the fully retracted or travel mode.

As shown in FIG. 1, a device generally shown by the reference numeral 10 is attached to a truck 11. The device includes a cable removing boom 12 which is supported by hydraulic pistons 13 and 14 near the back of the vehicle, and by hydraulic pistons 16 near the middle of vehicle 11.

The device for removing cable includes a cable pulling wheel 17 at one end of the cable removal boom 12 and a cable cutting means 18 at the other end of boom 12. Vehicle 11 is stabilized by support jacks 19 in a conventional manner. A similar vehicle would be used for installing cable, since it would also be pulled through the conduit using a lead wire.

The present invention contemplates the extension of a telescoping boom assembly 20 having a sheave at its lower terminal end for transferring the cable being pulled from a conduit from a horizontal direction to a vertical direction leading up to the cable pulling wheel 17. Thus, when pulling old cable for salvage or new cable for installation, the same concepts are employed.

The boom assembly 20 of the present invention includes a mounting bracket 21 for pivotally mounting boom assembly 20 on end 22 of boom 12. The boom 20 includes a housing 23 which pivotally mounts sheave 24 at the outer end of the boom 20. When the boom 20 is to be operated, it is first partially extended as shown in FIG. 1, and then is rotated by means of hydraulic piston 25 to a vertical alignment or orientation. The sheave 24 is lowered through manhole 26 to a point where the cable 27 can be pulled in a horizontal straight line direction from conduit 28 around sheave 24 and in a straight line up to cable pulling wheel 17. When the depth of the cable 27 is significant, such as perhaps as deep 20 to 30 feet below the manhole 26, an auxiliary support such as stiff-leg 29 can be provided as shown in FIG. 3b so that the tendency for the sheave 24 to move from the vertical is resisted. Similarly, the one edge 26a of the manhole 26 can be used as a support to counterbalance the force required to pull the cable 27 from the conduit 28.

As shown in FIG. 3, the telescoping boom 20 is angled at angle alpha with respect to the axis of the pulling wheel 17, which is shown in this figure as being mounted on winch 31. Sheave 24 is still capable of drawing the cable from the conduit in a straight line and then cable 17 travels between sheave 24 and pulling wheel 17 in a straight line. FIG. 3a shows the castering effect of rotation of sheave 24 to align the cable 27 to the plane of pulling wheel 17.

In FIGS. 4, 5, 6 and 7, the various components of the telescoping boom assembly 20 of the present invention are shown. The mounting bracket 21 functions as pivot point about the end 22 of conveyor and cutting boom 12 as previously shown in FIGS. 1 and 2. The telescoping boom housing 23 contains a main telescoping boom 33 which is fully retracted in FIG. 4, partially extended and labeled 33a in FIG. 5 and fully extended from the boom housing 23 and labeled 33b in both FIGS. 6 and 7. FIG. 7 also includes a stinger boom 37 which doubles the extension of the boom to its maximum depth, thereby positioning the sheave 24 at its furthest distance from the cable pulling wheel 17.

In its most compact form, shown in FIG. 4, the main boom 33 is fully extended upwardly so that the sheave 24 is at its closest or most retracted position to the boom housing 23 which in turn is fixedly mounted on the end 22 of cable boom 12. Through the use of hydraulics, as described herein below, the master cylinder 38 causes the first piston actuator assembly 39 to retract into the cylinder 38, thereby causing piston assembly 39 to be enclosed by cylinder 38 and extend boom 33 to a length 33a. Piston assembly 39 further includes a nested piston actuator assembly 41, which is in the extended position shown in FIGS. 4 and 5. By further application of hydraulic fluid, as will be described herein below, nested piston assembly 41 is also retracted into the already combined master cylinder 38 and first piston assembly 39, thereby further extending the main telescoping boom 33 to its fully extended position 33b. At this point, sheave 24 has been lowered to a point below the manhole 26 and is aligned with a cable in a conduit, not shown in these views.

Also contained within the main telescoping boom 33 is a stinger boom 37 which has sheave 24 attached thereto. Again, as will be described herein below, hydraulic pressure causes the stinger boom 37 to extend, thereby giving a maximum depth into the interior of the chamber. The hydraulics are arranged so that these hydraulic mechanisms function sequentially, whereby first piston assembly 39 is actuated, followed by second nested piston assembly 41, finally followed by the stinger boom 37 contained in main boom 33.

When the cable 27 has been pulled and it is desired to remove the telescopic boom 33 and sheave 24 from the manhole, the last extended member, stinger boom 37, is the first to be retracted, followed by the extension of second nested piston 41, followed by the extension of first piston member 39. Thus, the extension of sheave 24 is retracted in the opposite sequential order of hydraulic means.

Figure 10:
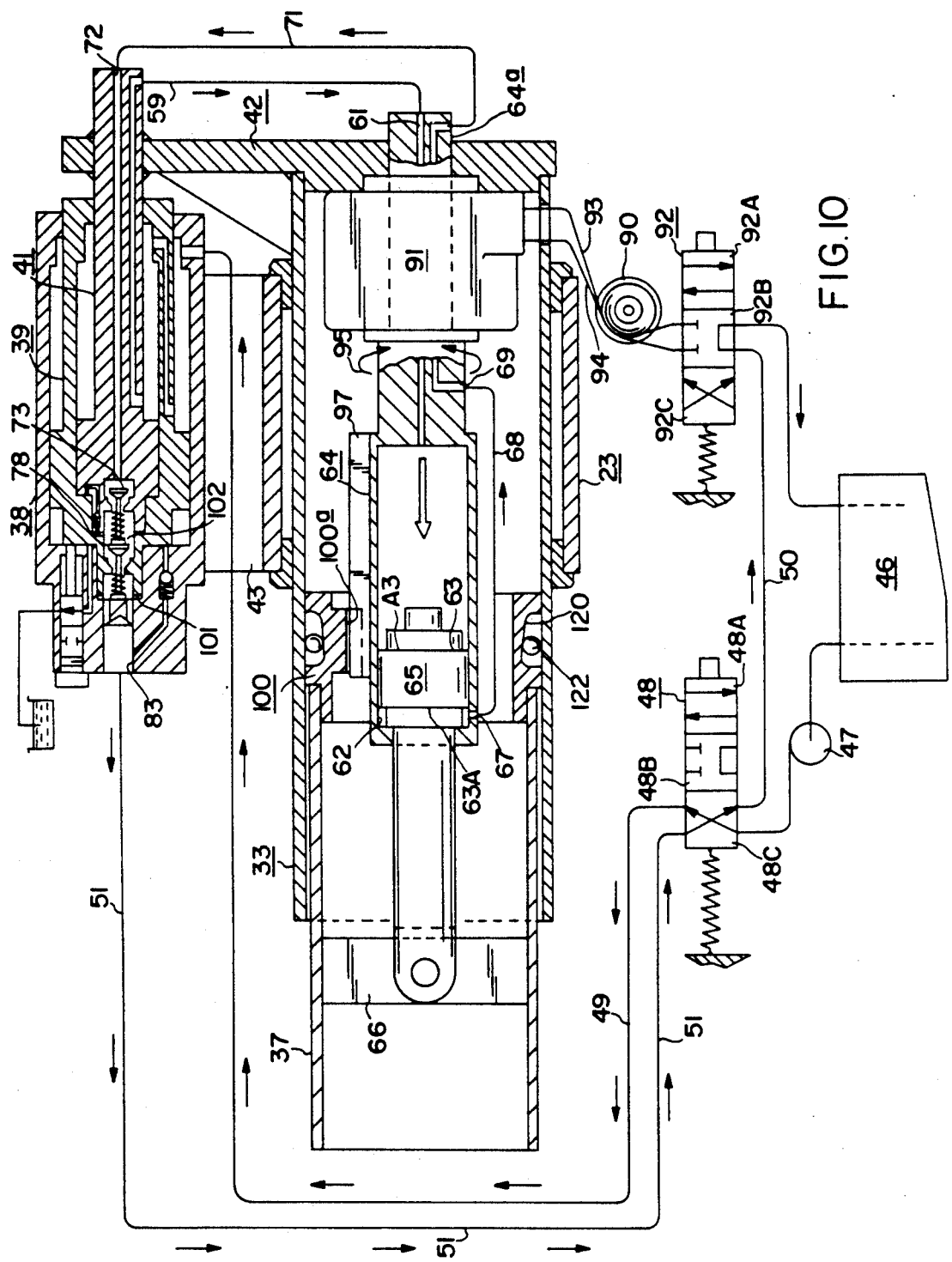
FIG. 10 is a schematic elevational view similar to FIG. 9 but showing the master cylinder and associated boom in the fully extended down-hole mode.

Turning now to FIG. 9, the operation of the hydraulics of the preferred embodiment is described in detail, showing the device as would be seen in FIG. 4. Shown in FIG. 10 is the same device as would be seen in FIG. 7.

Boom housing 23 mounts a hydraulic master cylinder 38 by means of a bracket 43. The outer terminal end of piston assembly 41 is fixedly attached to the outer terminal end of the boom assembly 20 by means of a capping bracket 42. Capping bracket 42 encapsulates and axially mounts a hydraulic motor, as later described. Bracket 42 itself is secured to the outer terminal end of the main boom 33.

The oil for the hydraulic system is contained in oil reservoir sump 46 and is transferred via pump 47 through a three way valve 48. In FIG. 9, the valve 48 is shown in the off position, 48B, where no oil flows through either oil flow path 49 or 51, but rather recycles through recycle line 50 back to sump 46.

As has been stated the arrangement in FIG. 9 shows the boom 20 in its fully retracted position, such as in FIG. 4. Movement of valve spool 48 to position 48C causes oil from pump 47 to flow along flow path 49 into oil port 52 and then into chamber 53. As the pressure builds up, hydraulic pressure against surface 54, having an area A1, will cause a piston 39 to move to the left in the figure. Surface 54, having area A1, is the surface on which the hydraulic pressure will operate.

Oil flow from chamber 53 also passes through oil port 55 into chamber 56, again causing hydraulic pressure against surface 57, which has an area A2. A2 is the second largest area which the hydraulic fluid will operate on.

Oil then leaves chamber 56 along oil port 58, to oil path 59 and into oil port 61. Oil flows into port 61 and enters chamber 62, thereby presenting hydraulic pressure on surface 63. Surface 63 has an area A3. As oil pressure builds, it is opposed by oil on the other side of each piston. Until the oil can be displaced, however, the pistons cannot move. First piston assembly means 39 recedes into master cylinder 38 because oil can be displaced from cylinder 38. At this point, poppet valve 78 opens. Once piston 39 has reached a stop, the pressure on surface 57, having area A2, acts on piston 41 to cause it to move into the interior portion of the piston assembly 39. Finally, when piston assembly 41 has reached its end of travel, and opens poppet valve 73, oil can be displaced from chamber 76, which will cause piston 65 to move within cylinder 64, thereby moving stinger boom 37 which is attached to cylinder 64 by mounting bracket 66. Once the oil completely fills chamber 62 and causes the piston 65 to fully extend stinger 37, oil flows through oil port 67 and oil path 68 and back into port 69 and through into oil path 71. Until poppet valves 73 and 78 are open, oil cannot flow in the extension direction for any cylinder other than in the sequential order desired.

Shown in FIGS. 9 and 10 is the flow from chamber 62 through port 67 line 68 port 69 and line 71 into inlet 72. Oil then flows through inlet 72 passed poppet valve 73, which is opened by compression of spring 74. Note that large chamber 76 has a significantly greater area than nesting chamber 77, so that the exposed portion of piston 41 for oil flow in the reverse direction will be only against surface 102, which has a surface area of A4. Similarly, compression of poppet valve 78 and spring 79 allows the nesting portion of piston 39 to decrease in area from large chamber 81 to the nesting chamber 82. Thus, only surface 101, having area A5, will be exposed to hydraulic pressure in reverse direction.

Poppet 78 will be nested in small chamber 82 upon movement of the piston 39 to the recessed position. Oil then flows through exit port 83 via bypass ports 84 and returns by line 51 to valve 48, using valve position 48C, for return through line 50 into the sump 46.

In this schematic, oil from chamber 81 also passes to sump when slide valve 86 aligns escape port 87 with oil flow path 88 to sump.

In another embodiment of the present invention, the stinger boom 37 and its associated sheave 24 may be angularly positioned with respect to the axial center line of boom 20. To this end a hydraulic motor 91 is axially positioned and fixedly mounted to the bracket 42 and has a centrally mounted shaft 64a which is an extension and integral part of hydraulic cylinder 64. The shaft 64a within the hydraulic motor 91 may have affixed to it a vane, not shown, that is angularly displaceable about the motor axis under the influence of hydraulic pressure from either line 93 or 94. The hydraulic cylinder 64 is equipped with two longitudinal extending keys 97. Spaced 180° apart, the keys 97 engage in two cooperating key slots 100a formed in the capping end bearing ring 100 fixedly secured to the stinger boom 37. It can be seen then that actuation of hydraulic motor 91 by pressurization of either line 93 or 94 will cause either a clockwise or counter clockwise rotation of shaft 64a and integrally connected cylinder 64 and then through the inter engagement of key 97 and keyways 100a in end bearing ring 100 a corresponding rotation will be transmitted to the stinger boom 37 and its attached sheave 24. Three way valve 92 allows flow path 92A and 92C for transferring oil along flow lines 93 and 94 to turn either counterclockwise or clockwise in the direction shown in FIG. 10 by arrow 95. The lines 93 and 94 are flexible lines whereby movement of the telescoping boom 20 is neatly controlled by means of a spring biased reel 90.

It is necessary to align the sheave to the cable. In this manner, the terminal end of the cable conduit 28, sheave 24, the vertical rise of cable 27, and cable pulling wheel 17 all will lie within a common plane when sheave 24 is adjusted using motor 91.

In still another embodiment of the invention as shown in FIGS. 9 and 10, a safety feature has been included to prevent the ejection of stinger boom 37 from the main boom 33 in the event a failure should occur at the weldment 64b. Weldment 64b shown in FIG. 12, forms the actual physical connection of hydraulic cylinder 64 to hydraulic motor shaft 64a. To provide a safety device, the capping end bearing 100 has a circumferentially extending tapered grove 120. The groove is deepest toward the sheave mounted end of the boom 37 and shallowest at the inner terminal end of the bearing 100 toward the hydraulic motor 91. The tapered groove contains a circumferentially extending array of spaced nylon balls 122. The balls 122 are of a diameter the same as the deepest portion of the groove 120. As the stinger boom 37 is extended by means of a piston actuator 65 the balls 122 move up the slope of the tapered groove 120 and exert an increasing braking pressure or drag on the inner diameter of the main boom 33. When the stinger boom 37 is retracted, the balls 122 ride down the slope of the tapered groove 120 releasing the wedging or drag effect.

When the device is in the position shown in FIG. 10, in schematic, operation of the oil in the direction shown by the arrows along lines 49 and 51 will have caused movement of pistons 39 and 41 to the positions shown in FIG. 10. Reversal of the oil flow, such as by adjusting valve 48 to position 48A, will cause oil to flow first through line 51 and returning through line 49. When this happens, oil flows through poppet valve 78, then through poppet valve 73, then along axial port 72 and ultimately into chamber 62 to present oil pressure against surface 63A, which has surface area A3.

As pressure builds up, area A3 on surface 63A is the largest area which sees hydraulic pressure and therefore piston 65 is the first to move, retracting stinger boom 37 from the position shown in FIG. 7 to the position shown in FIG. 6. While oil pressure still continues to build up and piston 65 has travelled to its end position, shown in FIG. 9, oil bears on surfaces 101 and 102. Since surface 102 has an area A4 which is greater than the surface 101 area A5, the hydraulic pressure will first cause piston 41 to expand and move the piston 41 out of the nesting chamber 77.

Once this occurs, of course, the area seen by piston 41 is much greater and piston 41 moves to the position shown in FIG. 9 again. Finally, pressure on surface 101, which has area A5, causes this smallest of all of the surfaces to move so that the valve comes out of nesting chamber 82. Again, then, the piston 39 moves to its extended position, thereby retracting the last portion 33a of the telescoping boom 33. In each case, the movement of the various pistons and booms is governed by the relative ratio of the surface area in the chamber where oil pressure is seen.

The master cylinder 38 has a fixed reference for movement in both an extension direction and a retraction direction, since it is fixedly mounted to the telescoping boom housing 23. Area A1 is presented by first nesting piston 39 for movement in the extension direction and area A5 for movement in the retraction direction. Auxiliary cylinder 64, which is also mounted fixedly to the housing 23, includes a piston 65 which has an area A3, shown as 63 and 63A, which is the same area A3 for movement in both the extension direction and the retraction direction.

Finally, the second nested piston 41 has a surface 57 which has area A2 for movement in the extension in direction and surface 102 having area A4 for movement in the retraction direction. The hydraulic lines provide fluid to the master cylinder 38 and the auxiliary cylinder 64 in series.

Since poppet valves 78 and 73 prevent oil displacement out of sequential order, fluid pressure in the extension direction sequentially moves piston 39, and thereafter piston 41, and thereafter piston 65. Since area A3 is greater than area A4, which in turn is greater than area A5, fluid pressure in the retraction direction reverses the sequential order of movement of said pistons, so that piston 65 moves before piston 41 and piston 41 moves before piston 39. Thus, the sequential order of movement of the extension boom in the extension direction moves in series as oil is displaced in cylinder in series. Retraction draws in the least substantial first and then eventually to the most substantial portion of the boom assembly.

Figure 11:
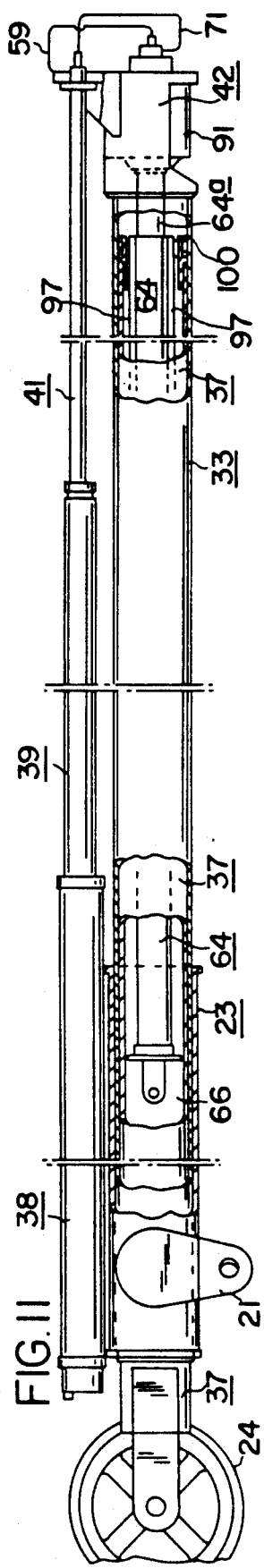
FIG. 11 is a greatly enlarged elevational view of the telescoping boom or master cylinder removed from the supporting structure of the cable pulling apparatus, having portions broken away and in section and length of continuous detail removed between break lines in order to show details more clearly.

Turning now to FIG. 11, there is shown a greatly enlarged elevational view of the telescoping boom and master assembly after it has been removed from the supporting structure of a cable pulling apparatus. Break lines are shown to allow the entire length of the device to be placed in one figure. The master cylinder 38 once again accommodates the first nested piston assembly 39 and a second nested piston assembly 41 as described previously. The pivotal mounting bracket 21 provides a fixed point of movement with respect to the bed of the vehicle or any other fixture to which the device is attached. Boom housing 23 is of course mounted firmly to the mounting bracket 21. Both pistons 39 and 41 are fully extended, thereby placing the apparatus in its retracted position, so that sheave 24 is closest to the point of reference, symbolized by mounting bracket 21. As has been previously described, when nested piston assemblies 39 and 41 retract, by hydraulic fluid passing in series through the various hydraulic cylinders, the main boom is extended. Thereafter, the stinger boom 37 is extended so that the operation is sequential. In withdrawing or retracting the sheave 24 to a position closest to the mounting bracket 21, stinger boom 37 retracts first, then followed in sequence by movement of second nested piston assembly 41 and finally movement of first nested piston assembly 39. This is a sequential operation in the reverse order from the extension operation.

Figure 12:
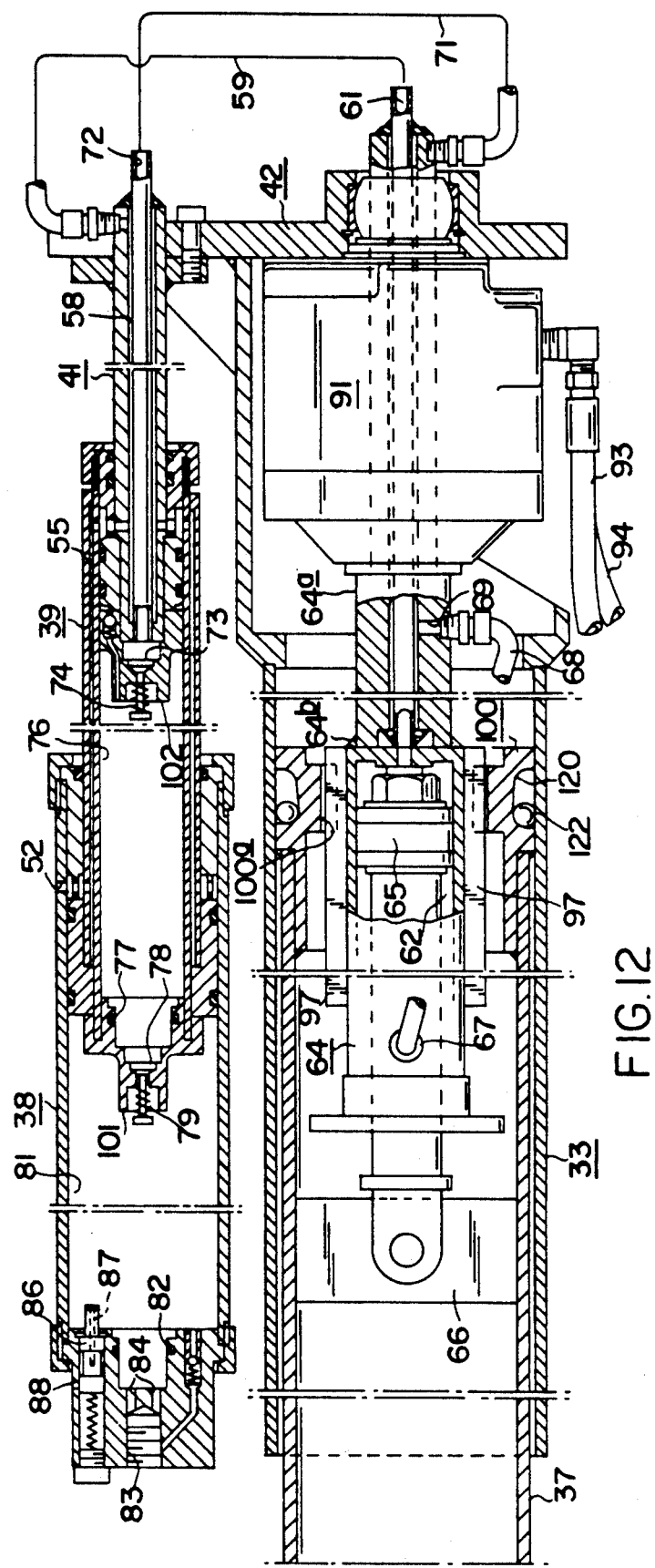
FIG. 12 is a still greater enlarged section elevational view of the telescoping boom, and the two stage telescoping master cylinder showing details of construction. Again large lengths of continuous detail have been deleted between break lines in order to show details clearly.

Shown in FIG. 12 is an even greater enlarged sectional elevational view of the present invention and the multiple stage telescoping cylinders, showing further details of construction, such as the existence of seals and the like. This view and FIG. 11 show the actual design as compared to the schematic drawings of FIGS. 9 and 10. The reference numbers applies to all the figures are applied again in FIGS. 11 and 12 to the same parts.

Of particular interest in FIG. 12 is the showing that the oil flow path from one cylinder to another in series, thereby sequentially extending the moveable end and retracting that end in a reverse sequential order.

While particular embodiments of the present invention have been illustrated and described herein, it is not intended to limit the invention, and changes and modifications may be made therein with the scope of the following claims.

What is claimed is:

1. An extensible mechanism, comprising:
   master cylinder means having a fixed reference for movement in an extension direction and a retraction direction;
   first piston means in said master cylinder, having means for displacing oil in said master cylinder for movement in said extension direction and a first piston area for movement in said retraction direction;
   an auxiliary cylinder on said fixed reference, including an auxiliary piston means having means for displacing oil in said auxiliary cylinder and an auxiliary piston area for movement in said retraction directions; and
   hydraulic means for providing fluid to said master cylinder and said auxiliary cylinder in series, to permit sequential displacement first in said master cylinder and then in said auxiliary cylinder and wherein said auxiliary piston area is greater than said first piston area, whereby fluid pressure in the extension direction sequentially moves said first piston and thereafter said auxiliary piston and fluid pressure in the retraction direction reverses the sequential order of movement of said pistons.

2. An extensible mechanism, comprising:
   master cylinder means having a fixed reference for movement in an extension direction and a retraction direction;
   first nested piston means in said master cylinder, having first oil means for displacing oil in said master cylinder for movement in said extension direction and a first piston area for movement in said retraction direction;
   an auxiliary cylinder on said fixed reference, including an auxiliary piston means having means for displacing oil in said auxiliary cylinder and an auxiliary piston area for movement in said retraction directions;
   second nested piston means in said first piston means, having second oil means for displacing oil in said first piston means for movement in said extension direction and a second piston area for movement in said retraction direction; and
   hydraulic means for providing fluid to said master cylinder and said auxiliary cylinder in series, to permit sequential displacement in said first oil means, said second oil means and then said auxiliary cylinder, and wherein said auxiliary piston area is greater than said second piston area, which is greater than said first piston area, whereby fluid pressure in the extension direction sequentially moves said first piston and thereafter said second piston and thereafter said auxiliary piston, and fluid pressure in the retraction direction reverses the sequential order of movement of said pistons.

3. The mechanism of claim 2 which further includes axial adjustment means for rotating at least one of said piston means about the axis of said extension direction.

4. A mechanism for actuating an element between extended and retracted positions, comprising:
   master cylinder means having a fixed reference for movement in an extension direction and a retraction direction;
   first nested piston means in said master cylinder, having first oil means for displacing oil in said master cylinder for movement in said extension direction and a first piston area for movement in said retraction direction;
   an auxiliary cylinder on said fixed reference, including an auxiliary piston means having means for displacing oil in said auxiliary cylinder and an auxiliary piston area for movement in said retraction directions;
   second nested piston means in said first piston means, having second oil means for displacing oil in said first piston means for movement in said extension direction and a second piston area for movement in said retraction direction; and
   hydraulic means for providing fluid to said master cylinder and said auxiliary cylinder in series, to permit sequential displacement in said first oil means, said second oil means and then said auxiliary cylinder, and wherein said auxiliary piston area is greater than said second piston area, which is greater than said first piston area, whereby fluid pressure in the extension direction sequentially moves said first piston and thereafter said second piston and thereafter said auxiliary piston, and fluid pressure in the retraction direction reverses the sequential order of movement of said pistons; said master cylinder and auxiliary cylinder being positioned with respect to said fixed reference such that movement of sad first piston means and said second position means in one direction with respect to said fixed reference and movement of said auxiliary piston means in the opposite direction with respect to said fixed reference produces additive movement of said element to said extended and retracted positions.

* * * * *